O. W. HANSON.
PISTON PACKING RING.
APPLICATION FILED OCT. 8, 1918.
1,344,342.
Patented June 22, 1920.
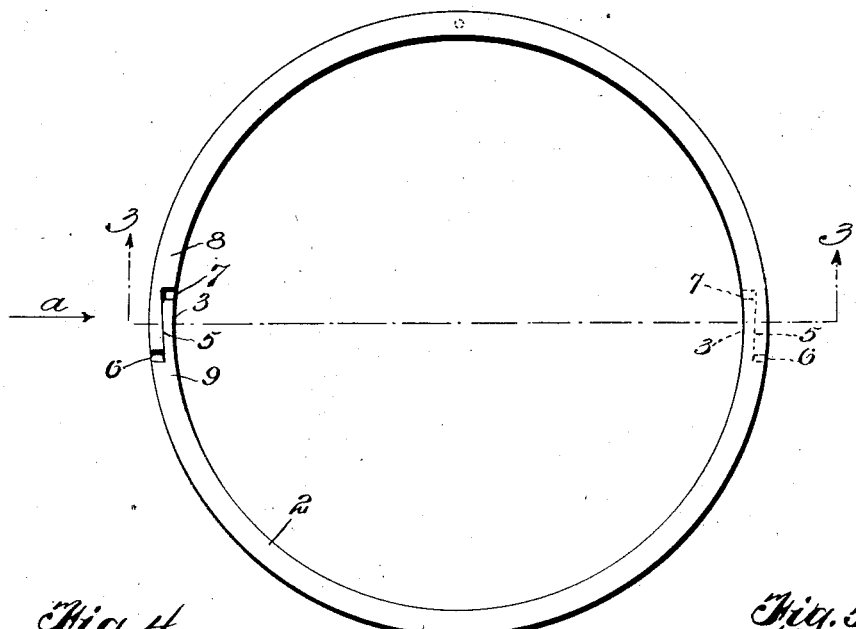
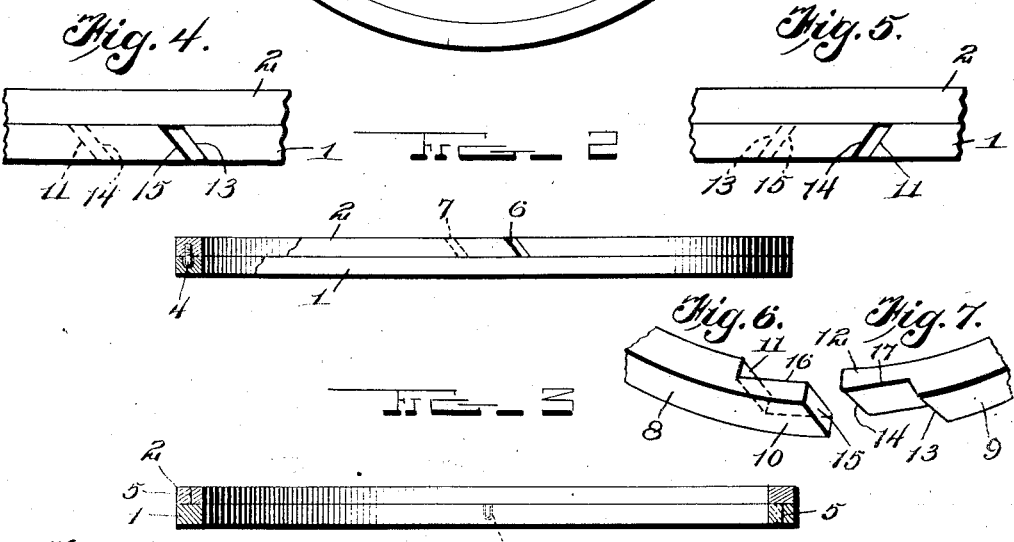
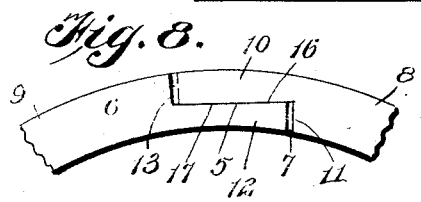
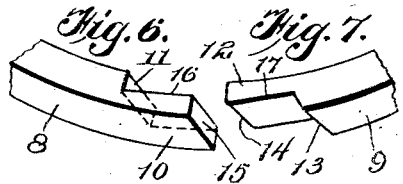
Inventor
O. W. Hanson
By
Attorney.

UNITED STATES PATENT OFFICE.

OSCAR W. HANSON, OF SALINA, KANSAS.

PISTON PACKING-RING.

1,344,342.  Specification of Letters Patent.  Patented June 22, 1920.

Application filed October 8, 1918. Serial No. 257,343.

*To all whom it may concern:*

Be it known that I, OSCAR W. HANSON, a citizen of the United States, residing at Salina, in the county of Saline and State of Kansas, have invented new and useful Improvements in Piston Packing-Rings, of which the following is a specification.

My invention relates to packing rings for the pistons of internal combustion motors, and particularly to a piston ring of the type embodying a pair of opposed split spring rings, although features of construction may be employed in single split rings.

The primary object of my invention is to provide a compound ring composed of a pair of opposed split rings, each having a lap joint of novel construction to reduce leakage, said rings being so arranged that in the event of possible leakage through one ring member complete passage of the products of combustion past the compound ring will be prevented or reduced to the minimum by the barrier formed by the other ring member.

Another object of the invention is to provide a ring member with a lap joint acting to efficiently reduce or prevent leakage and to permit proper expansion and contraction of the ring while compensating for wear to maintain the cylindrical form of the ring.

The invention consists in the features of construction, combination and arrangement of parts hereinafter fully described and claimed, reference being had to the accompanying drawing, in which:—

Figure 1 is a side view of a compound packing ring constructed in accordance with my invention.

Fig. 2 is an edge view, partly in section, of the ring, looking in the direction of the arrow *a* in Fig. 1.

Fig. 3 is a section taken diametrically through the ring on line 3—3 of Fig. 1.

Figs. 4 and 5 are enlarged detail views looking, respectively, toward the inner and outer peripheral surfaces of the ring, and showing one of the joints.

Figs. 6 and 7 are perspective views of the lapping ends of one of the ring members.

Fig. 8 is a side view of the lapping ends of one of the ring members on an enlarged scale.

In the practical embodiment of my invention I provide a piston ring comprising a pair of similar or counterpart ring members 1 and 2, adapted to fit within the groove of a piston in the usual manner, and each formed of suitable spring metal. The ring members 1 and 2 are arranged in parallel and concentric relation, said ring members being so disposed as to have their opposed lateral faces lying in contact with each other. Each ring is split at one point in its circumference as indicated at 3, to permit expansion and contraction thereof, and, when the ring members are assembled in operative relation, these split portions 3 are preferably arranged so as to lie at diametrically opposite sides of the composite ring. The object of this arrangement is to provide against leakage through the complete ring, in the event of leakage of the fluid through the split portion of one ring section, the passage of the fluid being then prevented by a solid portion of the adjacent ring section, as will be readily understood. By this means leakage of fluid past the composite ring is reduced to a maximum extent, inasmuch as complete leakage can not occur without passage of the fluid around at least one half the circumference of the ring, which is not liable to occur. The ring sections are suitably held to maintain their split portions in the fixed relationship described, as by pinning them together at one or more points, as indicated at 4, the construction for this purpose shown in the present instance consisting of a projecting pin upon the inner face of one ring section engaging a recess in the inner face of the adjacent ring section.

The split portion 3 of each ring section forms a scarf-point, providing lapping elements upon the ring section which slidably engage each other to permit expansion and contraction of the ring, while opposing a barrier to the passage of fluid through the joint. In accordance with my invention, the split portion 3 is made substantially on a Z-shaped line transversely through the ring member. This split formation produces a central slit 5 extending circumferentially of the ring and transversely between the lateral ring faces and end slits 6 and 7 extending radially of the ring and transversely between its lateral faces, the respective slits 6 and 7 intersecting the outer and inner peripheries of the ring and the opposite ends of the slit 5.

An important feature of my invention resides in the fact that the meeting portions of the surfaces of the scarf-joint thus formed upon and between the ring ends 8 and 9 are beveled for a riding contact with each other in such manner as to reduce liability of leakage and insure at all times in the use and wear of the ring a tight joint. As shown, the described construction of each split joint produces upon the ring end 8 a wedge-shaped tongue 10 and end abutment surface 11, and upon the ring end 9 a wedge-shaped tongue 12 and end abutment surface 13. The tongue 10 of the end 8 is disposed at the outer side of the joint and overlaps and rides upon the tongue 12 of the end 9, thus at all times maintaining the continuity of the ring at the joint in the expansion and contraction of the ring. The split portions 6 and 7 of the joint are formed on diagonal lines, the abutment surfaces 11 and 13 thus being beveled for riding contact with the respective ends 14 and 15 of the tongues 10 and 12, which are similarly beveled. In the sliding movements of the tongues 10 and 12, as a result of expansion and contraction of the ring, it will thus be understood that the beveled faces 11 and 15 and 13 and 14 will keep the ends of the split closed and prevent any formation of gaps through which leakage may occur.

The split 5 is formed on a straight line so as to provide the meeting faces of the tongues 10 and 12 with sloping surfaces 16 and 17 which contact for sliding movements on a rectilinear line oblique to radii of the ring passing through the extremities of the tongues. The object of this construction is to compensate for wear upon the outer surface of the tongue 12 due to the tendency of such tongue to spring outward at a tangent to the periphery of the ring as the ring decreases in diameter from wear and the tongues gradually move outward upon one another in the expansion of the ring to take up wear. In rings of ordinary construction having lapping tongues, it is well known that the outer surface of the outer tongue, through its increased friction on the cylinder wall due to its tendency to project outward is worn off at an angle and to a greater extent than the remainder of the surface of the ring. This results in time in a reduction in thickness of such outer tongue, as a result of which the tongue is liable to crumble or break under the pressures and strains falling upon it, thus rendering the ring useless. My improved construction of the surfaces 16 and 17 overcomes this objection, inasmuch as, when the ring expands to take up wear and the surfaces 16 and 17 slide outward upon one another, the angle at which said surfaces are formed causes the tongue 12 to be projected to just the necessary extent to compensate for the dual amount of wear falling upon the ring, that is the entire amount of wear upon the circumference of the ring and the increased amount of wear falling directly upon the outer surface of the tongue. Hence the tongue 12 will be projected to an efficient extent to maintain the circular conformation of the ring, while the increased depth of said tongue toward its tip caused by the described formation of the angular surfaces 16 and 17 permits of considerable wear upon the tongue without reducing its thickness to such an extent as to cause it to crumble or break under pressures and strains during the life time of the ring. Such construction also provides for a maintenance of the surfaces 16 and 17 in lapping contact, thus further reducing leakage of fluid at the joint.

In the use of the invention in actual service I preferably employ a composite ring composed of ring members of the construction disclosed, as this gives double security against leakage, but it is evident that the improved features of construction of each ring member may be employed in single packing rings with advantage in obtaining increased security against leakage at the joint in addition to a reduction of wear and tear upon the outer lapping ring end liable to cause breakage of the outer tongue and a material reduction in the period of usefulness of the ring. Inasmuch as the joint of each ring member, and the use of companion rings in a composite ring structure, will reduce leakage to a maximum extent, it will be evident that greater efficiency of the engine will be secured, as well as a reduction in the amount of carbon deposits with the disadvantages resulting therefrom.

Having thus fully described my invention, I claim:—

1. A piston packing ring comprising a split spring ring member having end portions provided with overlapping tongues, the meeting faces of said tongues slidably contacting on a rectilinear line obliquely inclined to radii of the ring passing through the extremities of the tongues, whereby said meeting surfaces of the tongues form coacting wedge surfaces to force the outer tongue radially outward on a spreading motion of the tongues in the expansion of the ring.

2. A piston packing ring comprising a split spring ring member having end portions provided with radially overlapping tongues, said tongues being wedge-shaped and having their meeting faces extending on a rectilinear line oblique to radii of the ring passing through the extremities of the tongues, whereby in the spreading of the joint due to ring expansion the outer tongue will be moved radially outward.

In testimony whereof I affix my signature.

OSCAR W. HANSON,